United States Patent [19]

Tonomura et al.

[11] Patent Number: 5,119,499

[45] Date of Patent: Jun. 2, 1992

[54] HOST PROCESSOR WHICH INCLUDES APPARATUS FOR PERFORMING COPROCESSOR FUNCTIONS

[75] Inventors: Motonobu Tonomura, Kodaira; Sigezumi Matsui, Musashimurayama; Kouji Hashimoto, Mitaka, all of Japan

[73] Assignees: Hitachi Ltd.; Hitachi Mircocomputer Engineering Ltd., both of Kodaira, Japan

[21] Appl. No.: 356,422

[22] Filed: May 25, 1989

[30] Foreign Application Priority Data

May 27, 1988 [JP] Japan .................. 63-128362

[51] Int. Cl.5 ............................................. G06F 15/16
[52] U.S. Cl. ........................... 395/800; 364/DIG. 1; 364/228.6
[58] Field of Search ... 364/200 MS File, 900 MS File

[56] References Cited

U.S. PATENT DOCUMENTS

| | | | |
|---|---|---|---|
| 4,509,116 | 4/1985 | Lackey et al. | 364/200 |
| 4,547,849 | 10/1985 | Louie et al. | 364/200 |
| 4,679,166 | 7/1987 | Berger et al. | 364/900 |
| 4,715,013 | 10/1987 | MacGregor et al. | 364/200 |
| 4,894,768 | 1/1990 | Iwasaki et al. | 364/200 |

OTHER PUBLICATIONS

MC68030 Enchanced 32-bit Microprocessor User's Manual 1987 Section 10.

*Primary Examiner*—David Y. Eng
*Attorney, Agent, or Firm*—Antonelli, Terry Stout & Kraus

[57] ABSTRACT

The execution of an instruction for one of co-processors is subrogated by information processing function implemented in the host-processor. When a co-processor identification code involved in the instruction for the co-processor agrees with a host-processor internal processing identification code set in the host-processor, the instruction decoder of the host-processor starts the information subrogating processing function. Thus, protocol control for communication from the host-processor to co-processors can be omitted so that a high-speed data processing becomes possible.

4 Claims, 5 Drawing Sheets

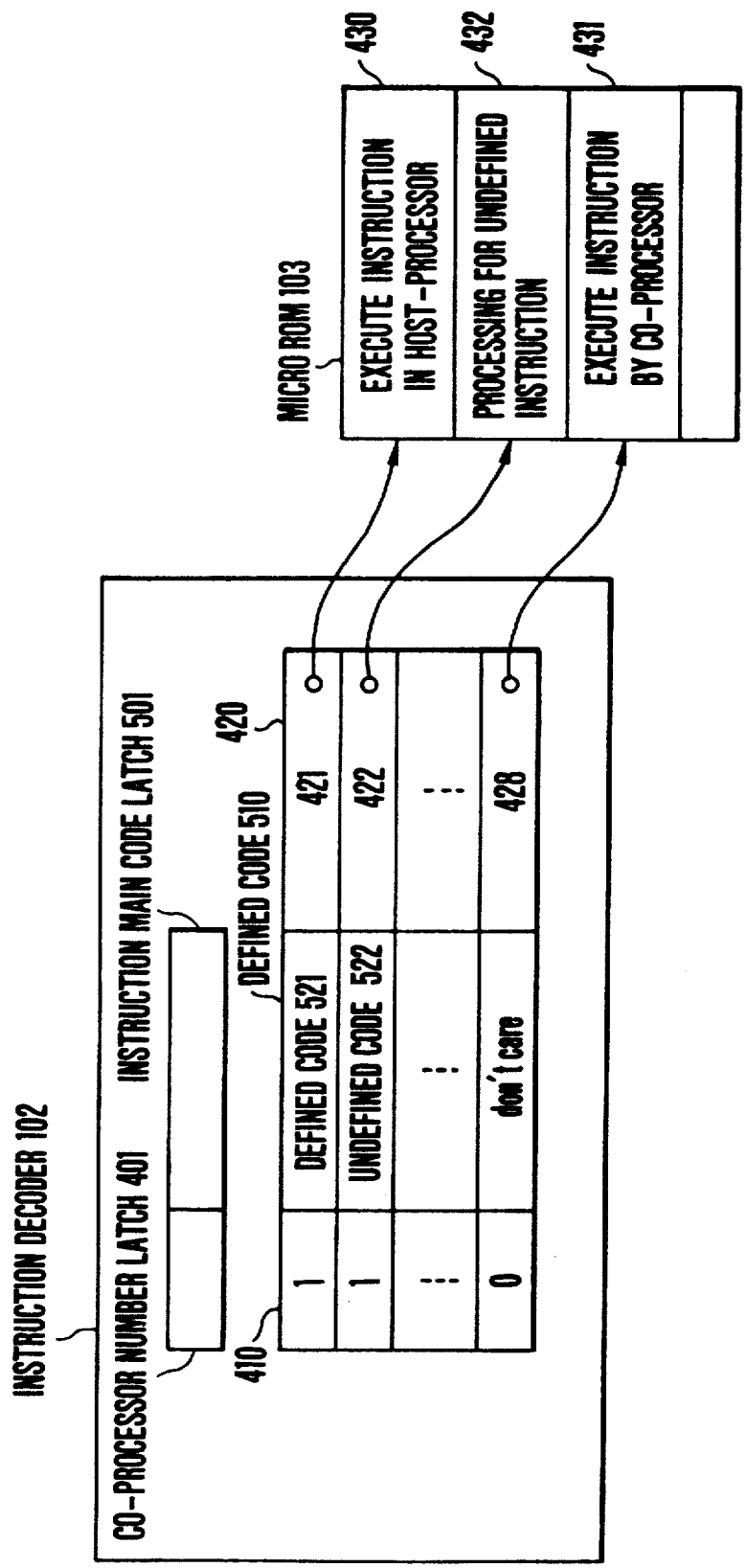

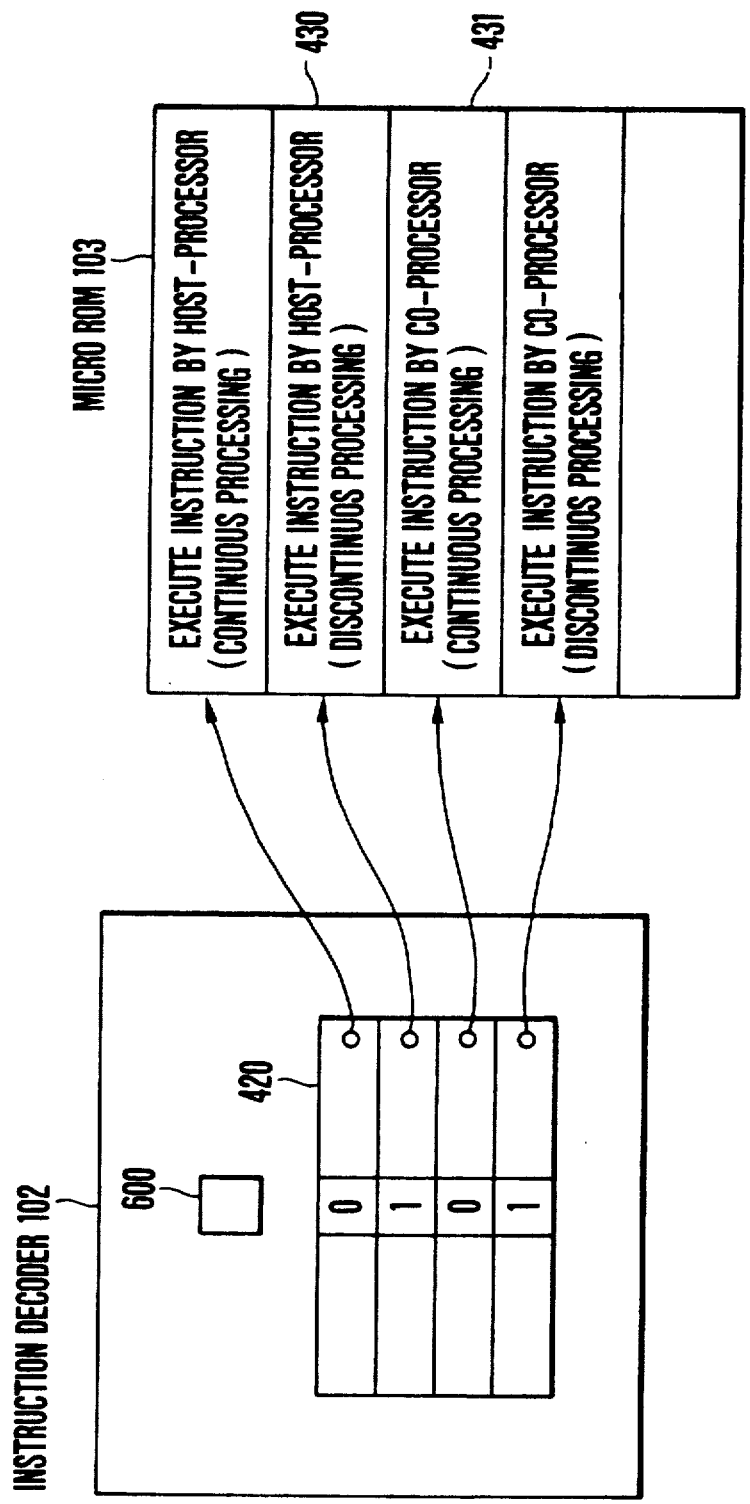

HOST PROCESSOR WHICH INCLUDES APPARATUS FOR PERFORMING COPROCESSOR FUNCTIONS

BACKGROUND OF THE INVENTION

The present invention relates to the control by a plurality of co-processors in order to enhance an ability of arithmetic and/or logical operations of a host processor in a computer system, and more particularly to a designation control method of a co-processor identification code which is suitable in implementing an execution function of an instruction of the arithmetic and/or logical functions for the co-processor in the host processor with the advancement of integration technology of constituent elements of the processor.

In the past, the co-processor is externally connected to the host processor in order to compensate for a function which is not implemented on a host processor chip due to an integration limitation. For example, with the advance of display technology, a powerful floating point arithmetic operation function is required for coordinate transform of image displaying graphics. Further, since calculation may be independently done for each coordinate component, the use of two or more floating point arithmetic operation co-processors is advantageous. In a field of artificial intelligence processing which has recently been becoming an object of public attention, a presently available general purpose microprocessor is not sufficient to handle artificial intelligence processing because of speciality in processing. Accordingly, it is significant to externally connect an artificial intelligence processing co-processor to a host processor. In those instances, in order to handle and control two floating point arithmetic operation co-processors of the same type or a plurality of co-processors of different types such as one floating point operation co-processor and one artificial intelligence processing co-processor, co-processor identification codes are used so that an inherent number is assigned to each co-processor. For example, in the Motorola Inc. 32-bit microprocessor MC 68030 (detail of which is described in "MC 68030 Enhanced 32-bit Microprocessor User's Manual, 1987", Section 10. Co-processor Interface Description, distributed by Motorola Inc.), an instruction format shown in FIG. 2 is defined in order to externally connect the co-processors to the host processor, handle an instruction of operation for the co-processor and control the plurality of co-processors. Specific codes 1111 in bit positions 12-15 indicate that the instruction relates to the co-processor. When the host processor decodes the instruction, it can identify the instruction to be executed by the external co-processor by the specific code. Three bits at the bit positions 9-11 defines the co-processor identification code. They can designate up to eight co-processor numbers to identify co-processors of the same type or different types. The bit positions 6-8 are type identification code of the co-processor instruction. The bit positions 0-5 are a field which is defined depending on the type of instruction. In accordance with this instruction format of the arithmetic and/or logical operations for the co-processor, it is possible to design external co-processors having various functions such as floating point arithmetic operation co-processor and artificial intelligence processing co-processor and define specific content of the operating instructions in accordance with the respective functions. It is also possible to control a mixture of up to eight co-processors of the same type or different types.

SUMMARY OF THE INVENTION

However, as the architectural technology of the processor advances with the improvement of the integration density of the constituent elements, the auxiliary function which has originally been to be executed in the co-processor can be implemented on the host processor chip. By performing such a function in the host processor, a protocol control required as a procedure to control the communication for the co-processor is saved and the operation speed is increased accordingly.

In such a case, the following problem arises in executing, in the host processor, the instruction programmed by using the instruction of operation for the co-processor (which includes the co-processor identification code) which has originally been defined to operate the external co-processor.

Namely, since the instruction programmed to be executed by the external co-processor can be executed only by the external co-processor, it is necessary to provide a new special instruction in order to execute the above programmed instruction in the host processor. For example, it is assumed that floating point addition (COP FADD) is used as the instruction of operation for the co-processor, and number 1 is designated as the co-processor identification code for one of the external co-processors. When the same function as the instruction execution functions of the co-processor is to be implemented in the host processor, it is necessary to modify the program by providing an operation code FADD having a different new code than COP FADD, or assign a co-processor identification code other than the number 1, for example, the number 0 which is not used for the external co-processor, as a host processor internal processing identification code in order to redesignate COP FADD, co-processor #0. Otherwise, it is not possible to provide means to a user for altering the processor which execute the instruction.

On the other hand, from a programming standpoint, when a program heretofore written and executed to control the external co-processor is to be shifted to a data processing system having a host processor in which a function for executing the instructions of operations for the co-processor is built in on one chip, it is desirable that the internal execution of the host processor is automatically started without requiring any modification of the program. Namely, from a user standpoint, it may be desirable to execute the instruction having the identification code COP FADD, co-processor #1 in the host processor without program modification.

In the instance of the Motorola Inc. 32-bit microprocessor MC 68030 mentioned above, it is possible in principle to assign any one of numbers 0-7 as the identification code for the host processor internal processing in the definition of the instruction format of the arithmetic and/or logical operation for the co-processor. However, the numbers 0-5 are reserved by Motorola Inc. for present use (number 1 for the floating point co-processors MC 68881 and MC 68882) and future use to control particular co-processors of Motorola Inc., and the numbers which the user may freely use are only numbers 6 and 7. In the co-processor numbers assigned to the co-processor identification code, the number 0 is fixedly assigned to the on-chip operation control of the memory management function which has no connection with the co-processor operation. In 32-bit microprocessor MC 68020 series which is one model earlier than MC 68030, memory management unit MC 68851 can be externally connected. Thus, the number 0 is assigned to the control therefor. In MC 68030, this memory management function is on the same chip and the external ship is not necessary. Thus, the number 0 is used for the control of the on-chip memory management function. The thought of using the instruction which has heretofore been used for the external chip, for the on-chip implementation as it is, as is done by Motorola Inc. is very natural one because of easy implementation. However, in this method, although the co-processors having numbers 0-7 could be freely externally connected by the definition of the instruction format, the restriction would be posed to the user in controlling a plurality of co-processors because the manufacturer reserves the use of some of those numbers. For example, if a user have been using the co-processor number 1 for a type of co-processor which is different from the co-processor number 1 reserved by Motorola Inc., Motorola Inc., will use the number 1 when the function of the co-processor number 1 defined by Motorola Inc. is incorporated on the host processor chip, in accordance with the thought of the Motorola Inc. As a result, the user cannot easily shift into a system of the host processor in which the function of the co-processor is incorporated on the same chip.

Accordingly, it is an object of the present invention to provide means for executing an instruction of operation for the co-processor in the host-processor in order to permit free use to a user, without any restriction to the user, of the numbers of the co-processor identification codes which have been heretofore provided to control a plurality of same or different types of co-processors.

The above object is achieved by providing to the host processor the means for starting a data processing function implemented in the host processor in response to the processor identification code contained in an instruction which is to be originally executed by the co-processor so that the execution of the instruction is subrogated by the data processing function implemented in the host processor.

Because of the provision of the above means, the instruction of operation for the co-processor can be executed in the host processor without requiring the user to make any modification to the instruction of operation for the co-processor which has already been programmed, even if the instruction which is to be originally executed by the co-processor is implemented in the host processor on the same chip.

BRIEF DESCRIPTION OF THE DRAWINGS

FIGS. 4 to 6 show block diagrams of an instruction decoder and a micro ROM in the host processor of FIG. 1.

DESCRIPTION OF THE PREFERRED EMBODIMENTS

Figure 1:
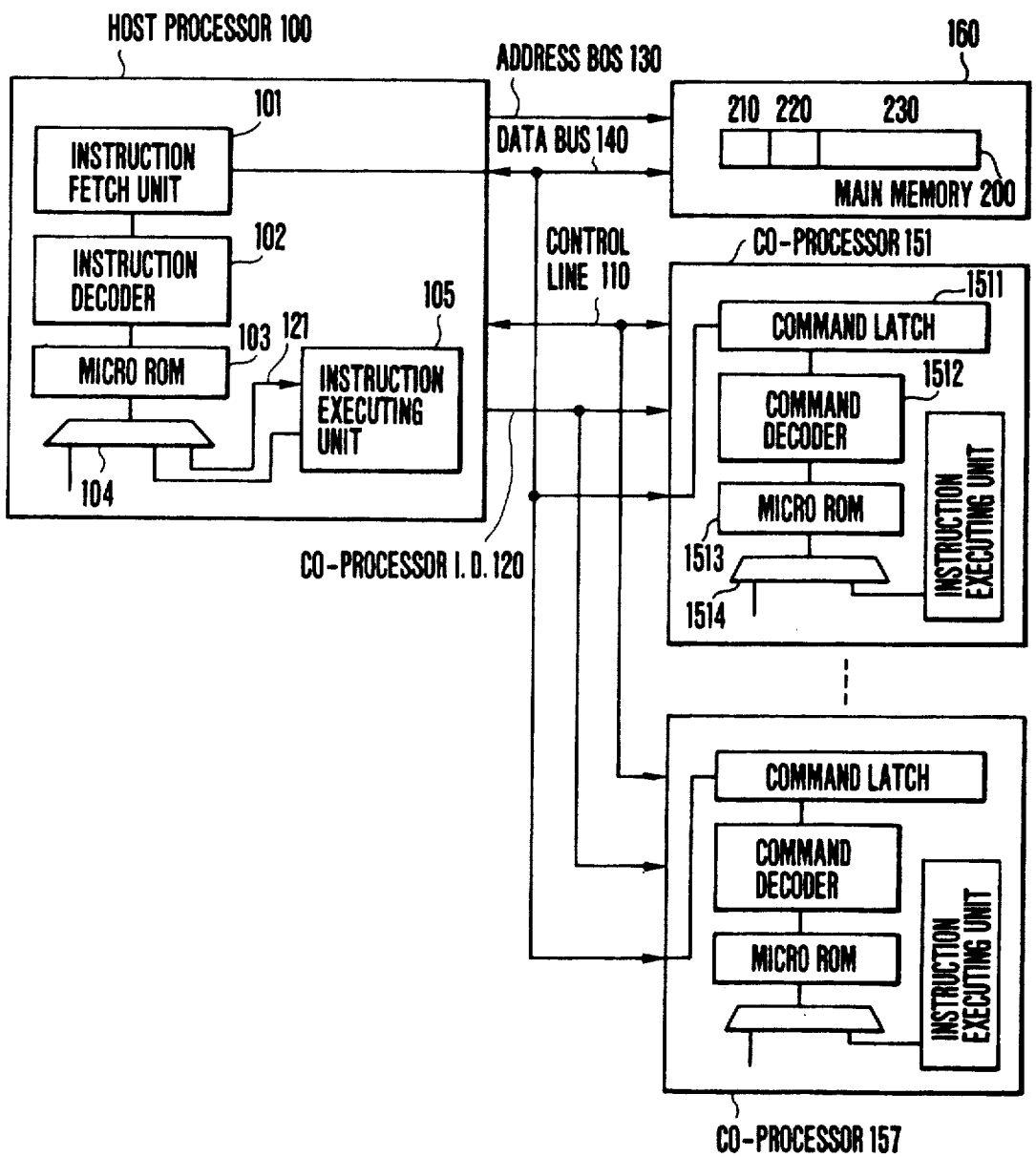
FIG. 1 shows a block diagram of a data processing system in which a host processor in accordance with one embodiment of the present invention is connected to a main memory and a plurality of co-processors.
Figure 2:
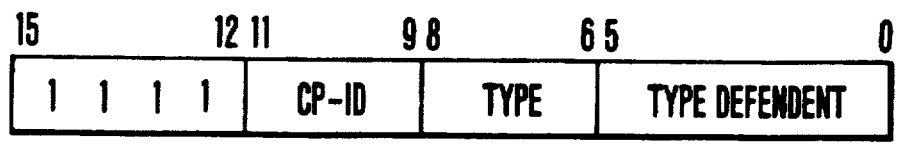
FIG. 2 shows an instruction format of an instruction of operation for a co-processor of a known microprocessor.
Figure 3:
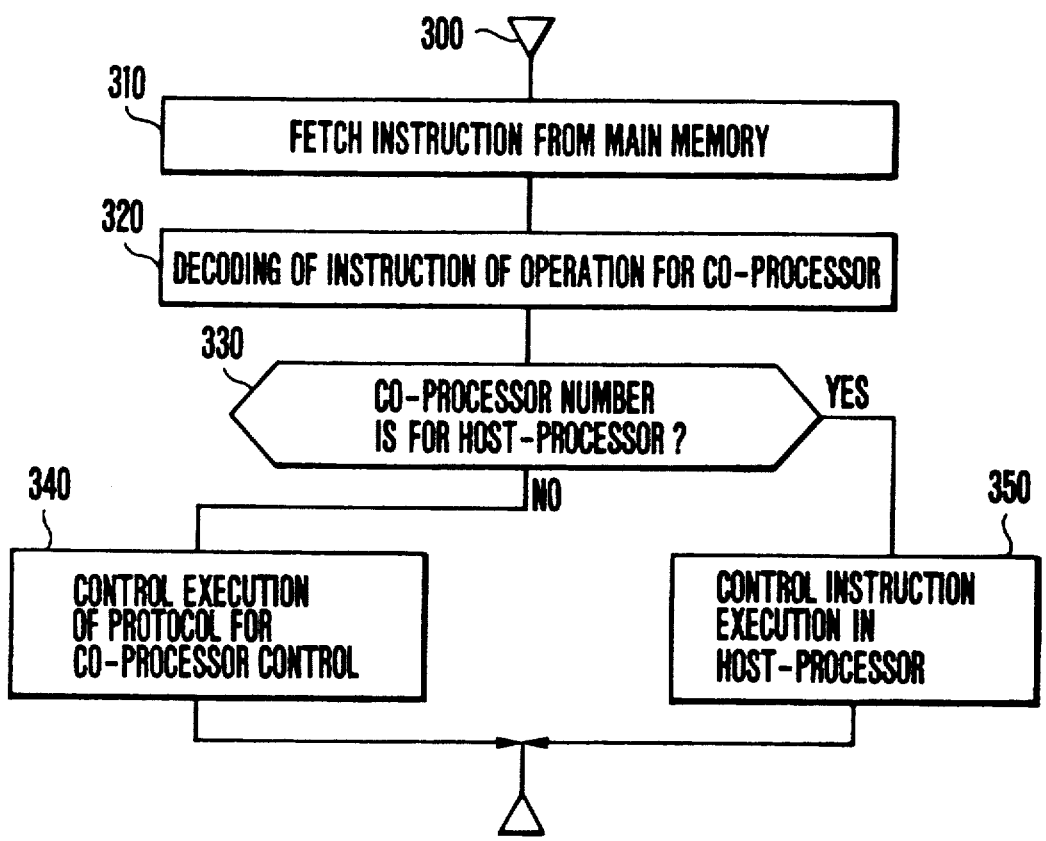
FIG. 3 shows a flow chart for explaining an operation of the host processor in accordance with the embodiment of the present invention.
Figure 4:
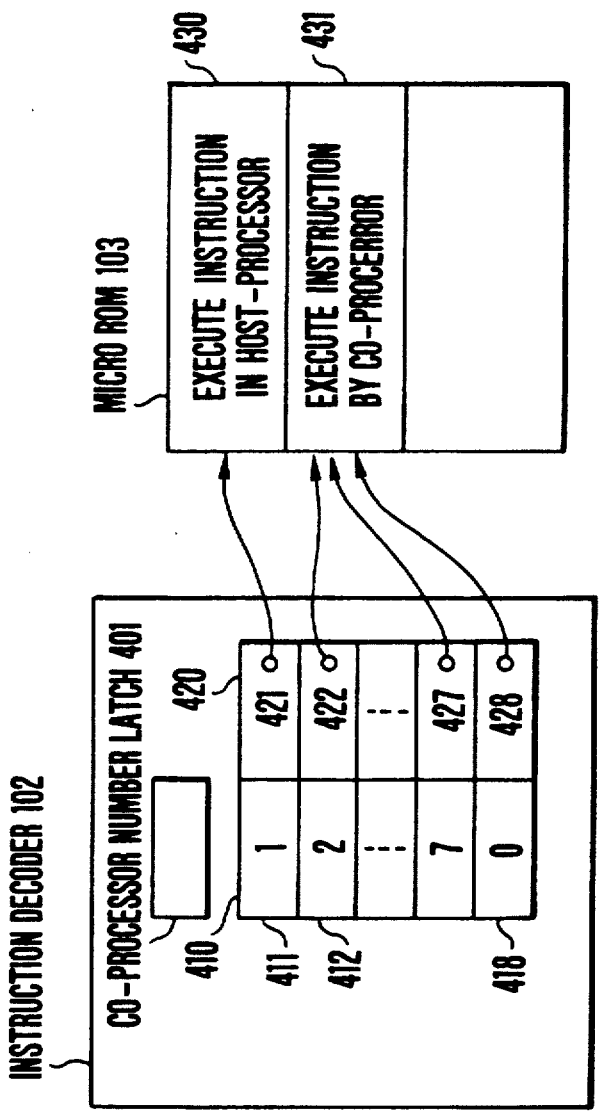

One embodiment of the present invention is now explained with reference to FIG. 1 and FIGS. 3 to 6. FIG. 1 shows a configuration and interconnection of a host processor 100, a plurality of co-processors 151 to 157 and a main memory 160. In order to communicate between the host processor 100 and the co-processors 151 to 157, a control line 110 is provided to indicate a type of access to a bus (access to the memory or access to the co-processor) and transmits a signal representing a response status such as normal acceptance or abnormal acceptance by the processor. In order to fetch an instruction code 200 of operation for the co-processor stored in the main memory 160, the host processor 100 sends an address signal therefor through an address bus 130 and fetches the instruction code of operation for the co-processor from the memory 160 to an instruction fetch unit 101 through a data bus 140. It decodes a content of the instruction code 200 by an instruction decoder 102. The instruction code 200 comprises a code field 210 for identifying the instruction code of operation for the co-processor, an identification code (co-processor id) 220 for identifying a co-processor which is to execute the instruction, and a main code field 230 which specifies a content of operation such as a floating point operation. A control unit which comprises the instruction decoder 102, a micro ROM 103 and a micro decoder 104, reassembles the instruction into a command data format in order to make the co-processors 151 to 157 execute the instruction, and sends a signal indicating the transfer to the co-processor to the control line 110 so that the command data is transferred not to the main memory 160 but to the co-processors 151 to 157, and sends the command data through the data bus 140. Specifically, in the actual execution by the co-processor, the code 210 which is no longer necessary at this point is deleted and the command data is efficiently compressed and rearranged to a form which the co-processor can decode. The number of the co-processor which is the destination of the transfer of the command data is sent over the co-processor id line 120. For example, if the co-processor number 1 is designated, the co-processor 151 receives the command data from the host processor 100 through the data bus 140 and latches it in a command latch unit 1511. The command is decoded by the command decoder 1512 and an entry address to the micro ROM 1513 is generated. The content of the micro ROM 1513 which is designated by the entry address is decoded by the micro decoder 1514 so that a co-processor instruction execution unit 1515 is micro-controlled to execute the instruction.

In order to permit the execution of the instruction of operation for the co-processor in the host processor 100 by incorporating the instruction execution function in the host processor 100 on the same chip instead of the execution of such instruction by the co-processor, the co-processor number in the co-processor identification code is designated as the number of the identification code for the internal execution within the host processor. For example, the co-processor number 1 is registered and designated as the identification code for the internal execution within the host processor. Thus, the program of the co-processor number 1 which has heretofore been used as an off-chip can be executed by the instruction execution unit 105 in the host processor 100. If the designation of the co-processor number 1 to the identification code for the internal execution within the host processor is initially set by hardware or software means in the data processing system, the instruction of operation for the co-processor number 1 can be executed by the instruction execution unit 105 in the host processor 100 without requiring the user to modify the existing program so long as the user does not change the designation of the specific co-processor number.

The operation of the host processor 100 is now explained. As shown in the flow chart of FIG. 3, the host processor fetches the instruction from the main memory 160 (310), decodes the instruction 200 of operation for the co-processor by the instruction decoder 102 (320) to determine whether the designated co-processor number 230 corresponds to the identification code for the execution by the host processor (330). If it corresponds, a control is made so that the instruction is executed in the host-processor (350). If it does not correspond, a protocol control for executing a conventional communication procedure is effected in order to make the external co-processor execute the instruction (340). As an example of specific means for determining whether the designated co-processor number corresponds to the identification code for the internal execution within the host processor, a combination of the instruction decoder 102 and the micro ROM 103 of the host processor 100 is explained with reference to FIG. 4. The co-processor number is latched in a storing unit 401 of the instruction decoder 102 of the host processor 100 and compared with the processor numbers 411, 412, 413, 418 loaded in a comparison unit 410. If the matched number is number 1, for example (411), the micro ROM entry address 421 for the microprogram 430 of operation for co-processor to be executed by the host processor is fetched and the program 430 is executed by the host processor 100 (350). If the number is one of 2 to 7 or 0, the program should be executed by the external co-processor 151, 152. 153 157 and a portion 431 of a microprogram for controlling the protocol is fetched and controlled (340). The entry address setting unit 420 (421–427) in the present invention comprise electrically rewritable storage means such as EPROM (electrically programmable ROM) or RAM (random access memory).

Problems and solutions therefor when only a portion of the function of the conventional co-processor is incorporated in the host processor chip are now discussed. A first problem is how the instruction which is not implemented in the host processor is to be executed by software or the external co-processor. There is a discontinuity between the instruction which is implemented and the instruction which is not implemented. When the instruction which is not implemented is to be executed by the external co-processor after the instruction which is implemented has been executed, the register data stored in the host processor should be transferred to a register in the external co-processor. The same is true when the instruction which is implemented is to be executed after the instruction which is not implemented. There are three ways to solve the above problem. A simplest way is to implement or not to implement all of the instructions of the program which have register dependency. A second way is to emulate the non-implemented instructions by software. As a result, the discontinuity for the use of the register does not occur. A third way is to provide a bit to monitor the discontinuous status so that the data is transferred between the registers when the discontinuity is detected. The second way may be implemented in a manner shown in FIG. 5. The co-processor number is latched in the storage unit 401. The portion 410 to be compared is same as that explained with reference to FIG. 4. The main code 230 of the instruction of operation for the co-processor is latched into the storage unit 501, and a portion 501 to be decoded is divided into a code portion 521 defined by being implemented and a code portion 552 which is undefined by being not implemented. For the implemented instruction, a pointer 421 to the micro entry address points the portion 430 of the micro ROM 103 which is to be executed by the host processor as it does in FIG. 4. For the non-implemented instruction, the pointer 422 points a microprogram portion 432 which emulates the undefined instruction by software. The other portions are same as those of FIG. 4. FIG. 6 shows the third method in which a bit 600 for monitoring the transition to discontinuity on the use of the registers is provided in a portion 420 which indicates the entry address of the microprogram and the entry address of the microprogram is changed in accordance with the content of the bit 600. The "0" bit 600 indicates the continuous transition for the use of registers, and the "1" bit 600 indicates the discontinuous transition for the use of registers. If the previously executed co-processor instruction belongs to the same category (one of two categories of the implemented instructions and the unimplemented instructions), the transfer between the registers is not necessary. Accordingly, the continuous processing unit proceeds to the process shown in FIG. 4. The discontinuous processing unit performs the necessary process.

In accordance with the present invention, where the execution function for the instruction of operation for the co-processor, which is executed by the off-chip co-processor is implemented on the host processor chip, it can be executed in the host processor at the high speed without modifying the instruction of operation for the co-processor. No limitation is imposed for the use of the co-processor on the number and type of the co-processors and the co-processor numbers.

What is claimed is:

1. A data processing system comprising:
    memory means for storing instructions and/or data; and
    a host processor, coupled to said memory means, for processing said instructions and/or data stored in said memory means and causing a plurality of co-processor information processing functions to be performed in response to processing of particular instructions, said host computer being coupled to a plurality of co-processors, each co-processor performs a co-processor information processing function in response to processing of one of said particular instructions by said host computer;
    wherein at least one co-processor information processing function is performed by execution means included in said host processor;
    wherein said host processor includes means for causing a co-processor information processing function requested by a particular instruction to be performed by one of said execution means and a co-processor in response to co-processor identification information contained in said particular instruction;
    wherein said means for causing includes:
    storage means for storing co-processor identification information contained in said particular instruction;

set/discrimination means for setting identification information for a co-processor information processing function performed by said execution means and discriminating relation between said identification information and said co-processor identification information stored in said storage means; and entry means for directing initiation of a process implementing said co-processor information processing function by said execution means or a co-processor in response to the output of said set/discrimination means.

2. A data processing system according to claim 1, wherein said entry means is electrically rewritable storage means.

3. A host computer, coupled to memory means for storing instructions and/or data and a plurality of co-processors, said host computer processes said instructions and/or data and causes a plurality of co-processor information processing functions to be performed in response to processing of particular instructions, said host computer comprising:

storage means for storing co-processor identification information contained in a particular instruction, said particular instruction when processed causes one of said co-processor information processing functions to be performed;

set/discrimination means for setting identification information for a co-processor information processing function performed by execution means included in said host computer and discriminating a relation between said identification information and said co-processor identification information stored in said storage means; and entry means for directing initiation of a process to implement said co-processor information processing function by said execution means or a co-processor in response to the output of said set/discrimination means.

4. A host processor according to claim 3 wherein said entry means is electrically rewritable storage means.

* * * * *